United States Patent
Baik et al.

(10) Patent No.: US 10,838,176 B2
(45) Date of Patent: *Nov. 17, 2020

(54) OPTICAL IMAGING SYSTEM

(71) Applicant: Samsung Electro-Mechanics Co., Ltd., Suwon-si (KR)

(72) Inventors: Jae Hyun Baik, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,913

(22) Filed: Feb. 19, 2019

(65) Prior Publication Data
US 2019/0179125 A1 Jun. 13, 2019

Related U.S. Application Data

(63) Continuation of application No. 15/586,351, filed on May 4, 2017, now Pat. No. 10,247,916.

(30) Foreign Application Priority Data

Dec. 26, 2016 (KR) .................. 10-2016-0179151

(51) Int. Cl.
*G02B 13/18* (2006.01)
*G02B 3/02* (2006.01)
(Continued)

(52) U.S. Cl.
CPC ......... *G02B 13/0045* (2013.01); *G02B 1/041* (2013.01); *G02B 9/64* (2013.01); *G02B 13/02* (2013.01)

(58) Field of Classification Search
CPC ...... G02B 13/0045; G02B 9/64; G02B 13/04; G02B 13/02; G02B 1/041; G02B 13/18; G02B 3/04; G02B 27/0025
See application file for complete search history.

(56) References Cited

U.S. PATENT DOCUMENTS 5,995,299 A 11/1999 Yoon
9,523,841 B1 * 12/2016 Chen .................. G02B 13/0045
(Continued)

FOREIGN PATENT DOCUMENTS

CN 107589523 A 1/2018
CN 207074297 U 3/2018
(Continued)

OTHER PUBLICATIONS

Korean Office Action dated Apr. 19, 2018 in counterpart Korean Patent Application No. 10-2016-0179151 (10 pages, with English translation).
(Continued)

*Primary Examiner* — Alicia M Harrington
(74) *Attorney, Agent, or Firm* — NSIP Law

(57) ABSTRACT

An optical imaging system includes a first lens having a positive refractive power, a second lens having a refractive index of 1.65 or greater, a third lens having positive refractive power and a refractive index of 1.65 or greater, a fourth lens having a positive refractive power, a fifth lens having a refractive index of 1.65 or greater, a sixth lens having a refractive index of 1.65 or greater, and a seventh lens having a positive refractive power. The first to seventh lenses are sequentially disposed from an object side to an imaging plane.

21 Claims, 9 Drawing Sheets

(51) Int. Cl.
*G02B 13/00* (2006.01)
*G02B 1/04* (2006.01)
*G02B 9/64* (2006.01)
*G02B 13/02* (2006.01)

(56) References Cited

U.S. PATENT DOCUMENTS

| | | | |
|---|---|---|---|
| 9,632,287 B2 * | 4/2017 | Chae | G02B 9/64 |
| 10,247,916 B2 * | 4/2019 | Baik | G02B 13/0045 |
| 2012/0056978 A1 | 3/2012 | Abe et al. | |
| 2015/0198791 A1 | 7/2015 | Kubota et al. | |
| 2016/0033742 A1 | 2/2016 | Huang | |
| 2016/0109687 A1 | 4/2016 | Son | |
| 2016/0187621 A1 | 6/2016 | Chen | |
| 2016/0223790 A1 | 8/2016 | Liao et al. | |
| 2016/0320590 A1 | 11/2016 | Mori | |
| 2017/0227734 A1 * | 8/2017 | Huang | G02B 13/0045 |
| 2017/0336606 A1 * | 11/2017 | Lai | G02B 5/005 |
| 2018/0011297 A1 | 1/2018 | Lai et al. | |
| 2018/0180855 A1 | 6/2018 | Baik et al. | |

FOREIGN PATENT DOCUMENTS

| | | |
|---|---|---|
| JP | S45-025834 B | 8/1970 |
| JP | 58-7971 B2 | 2/1983 |
| JP | 5-323183 A | 12/1993 |
| JP | 2001-33691 A | 2/2001 |
| JP | 4472054 B2 | 6/2010 |
| JP | 5369867 B2 | 12/2013 |
| KR | 10-2016-0044818 A | 4/2016 |

OTHER PUBLICATIONS

Korean Office Action dated Oct. 31, 2018 in corresponding Korean Patent Application No. 10-2016-0179151 (5 pages in English and 4 pages in Korean).

Korean Office Action dated May 29, 2019 in corresponding Korean Application No. 10-2016-0179151 (5 pages in English, 4 pages in Korean).

Korean Office Action dated Sep. 9, 2019 in corresponding Korean Patent Application No. 10-2016-0179151 (5 pages in English, 4 pages in Korean).

Chinese Office Action dated Nov. 26, 2019 in counterpart Chinese Patent Application No. 201710468410.2 (12 pages in English and 9 pages in Chinese).

Korean Office Action dated Jan. 29, 2020 in counterpart Korean Patent Application No. 10-2020-0007489 (7 pages in English and 5 pages in Korean).

Korean Office Action dated Apr. 3, 2020 in counterpart Korean Patent Application No. 10-2020-0007489 (6 pages in English and 4 pages in Korean).

Korean Office Action dated Sep. 1, 2020, in counterpart Korean Application No. 10-2020-0007489 (6 pages in English and 4 pages in Korean).

* cited by examiner

| EX1 | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| R | 1.390214 | 3.925433715 | 4.549919 | 2.235984 | 4.250378 | 4.919061 | 13.05193547 | -31.40704794 | 10.93572 | 13.35466 | 13.14147 | 5.211972711 | 1.577677157 | 1.358546279 |
| K | -0.025088 | 1.809689366 | 0.088148 | -1.199909 | 0.279799 | -0.182463 | -1.35099E-10 | 2.19217E-10 | -0.146437 | 4.998779 | -1.042252 | -27.66269327 | -1.222383351 | -0.799000254 |
| A | 0 | -0.032061259 | -0.101746 | -0.341148 | -0.063701 | -0.047142 | 0.04833582 | 0.03571457 | -0.063684 | -0.033867 | 0.234391 | 0.062699022 | -0.441151296 | -0.311158172 |
| B | 0 | 0.018731392 | 0.161354 | -0.006673 | -0.110036 | -0.286445 | -0.283567657 | -0.259296589 | -0.374755 | -0.38663 | -0.535111 | -0.126618932 | 0.247465628 | 0.153485801 |
| C | 0 | 0.005326798 | -0.036916 | 1.138414 | 0.215846 | 0.591365 | 0.623922692 | 0.56715956 | 1.028815 | 0.776145 | 0.537673 | 0.077337455 | -0.307970897 | -0.062188717 |
| D | 0 | -0.012596989 | -0.006315 | -5.656849 | -0.078277 | -1.377801 | -0.909616869 | -0.820394488 | -1.734849 | -0.815379 | -0.370272 | -0.031601568 | 0.015975777 | 0.016386469 |
| E | 0 | 0.006093519 | 0.052945 | 14.390079 | -1.41326 | 2.078145 | 0.915321016 | 0.694047702 | 1.778316 | 0.496655 | 0.153297 | 0.00032415 | -0.002041626 | -0.002591364 |
| F | 0 | -0.001285335 | -0.04315 | -18.45275 | 2.876399 | -1.813384 | -0.395298244 | -0.227384974 | -1.077645 | -0.159345 | -0.032754 | -0.00012605 | 0.000147774 | 0.000220632 |
| G | 0 | 0.000311231 | 0.010896 | 10.07754 | -1.318036 | 0.844535 | 0 | 0 | 0.277372 | 0.020128 | 0.002768 | 7.85814E-05 | -4.60018E-06 | -7.73079E-06 |
| H | 0 | 0 | 0 | 0 | 0 | 0 | 0 | 0 | 0 | 0 | 0 | 0 | 0 | 0 |

FIG. 3

| EX2 | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| R | 1.385224 | 6.073897401 | 4.725033 | 2.262834 | 3.794755 | 4.349647 | 10.9430723 | -70.94671067 | 9.241173 | 11.48717 | 12.8242 | 5.083778535 | 1.571218843 | 1.350303836 |
| K | -0.0277664 | 1.809673795 | 0.088168 | -1.2123025 | 0.278837 | -0.182504 | 1.26105E-08 | 3.19029E-08 | -0.146437 | 4.998778 | -10.42252 | -27.66269355 | -1.218361742 | -0.798637799 |
| A | 0 | -0.032647587 | -0.008842 | -0.028877 | -0.055067 | -3.047096 | 0.046713507 | 0.036221082 | -0.064887 | -0.0029622 | 0.230737 | 0.06344994 | -0.436190423 | -0.298611816 |
| B | 0 | 0.025670233 | 0.149614 | -0.228986 | -0.239835 | -0.179226 | -0.260396198 | -0.764417991 | -0.352483 | -0.384541 | -0.527212 | -0.126058537 | 0.238923194 | 0.145284176 |
| C | 0 | -0.006190831 | -0.069373 | 2.75682 | 0.908165 | 0.394644 | 0.533028175 | 0.591089183 | 0.97476 | 0.767216 | 0.529659 | 0.076986617 | -0.076681346 | -0.059148982 |
| D | 0 | -0.003573209 | -0.019991 | -11.30995 | -1.77409 | -0.780952 | -0.782216047 | -0.857605441 | -1.630449 | -0.80534 | -0.365209 | -0.031806818 | 0.015580848 | 0.015680115 |
| E | 0 | 0.002457576 | 0.058379 | 25.03965 | 0.662368 | 1.211793 | 0.837782919 | 0.713834866 | 1.679385 | 0.490813 | 0.151366 | 0.008505724 | -0.001095255 | -0.002491644 |
| F | 0 | -0.003546763 | -0.043766 | -29.20895 | 1.665202 | -1.200362 | -0.377395066 | -0.230219713 | -1.029737 | -0.157506 | -0.052363 | -0.001280977 | 0.000143236 | 0.000222883 |
| G | 0 | 4.8548E-05 | 0.010772 | 14.25767 | -1.059749 | 0.672082 | 0 | 0 | 0.267699 | 0.019889 | 0.002735 | 8.23799E-05 | -4.40465E-06 | -7.47384E-06 |
| H | 0 | 0 | 0 | 0 | 0 | 0 | 0 | 0 | 0 | 0 | 0 | 0 | 0 | 0 |

FIG. 6

| EX3 | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| R | 1.523747 | 6.681287141 | 5.197537 | 2.489096 | 4.17423 | 4.784612 | 12.03737953 | -78.04138173 | 10.16529 | 12.63589 | 14.10662 | 5.992156443 | 1.728340727 | 1.48533422 |
| K | -0.02766 | 1.809673795 | 0.088168 | -1.22303 | 0.279837 | -0.1825 | 1.26105E-08 | 3.190292E-08 | -0.14644 | 4.998778 | -10.4223 | -27.66260355 | -1.218361742 | -0.798637799 |
| A | 0 | -0.024528615 | -0.07426 | -0.0217 | -0.04137 | -0.03538 | 0.033096549 | 0.027713435 | -0.04875 | -0.02226 | 0.173356 | 0.047670879 | -0.327716321 | -0.224351477 |
| B | 0 | 0.015939195 | 0.092898 | -0.14218 | -0.14892 | -0.11129 | -0.161685552 | -0.164182769 | -0.22807 | -0.23877 | -0.32736 | -0.078272433 | 0.148352506 | 0.090210043 |
| C | 0 | -0.003178875 | -0.0356 | 1.414685 | 0.466032 | 0.202515 | 0.273527735 | 0.303322213 | 0.500206 | 0.393703 | 0.271799 | 0.039506308 | -0.039349655 | -0.03035278 |
| D | 0 | -0.001515389 | -0.00848 | -4.79652 | -0.75103 | -0.3322 | -0.331735963 | -0.363708425 | -0.69147 | -0.34154 | -0.15488 | -0.013489196 | 0.08665021 | 0.0066499 |
| E | 0 | 0.000861366 | 0.020462 | 8.776246 | 0.232156 | 0.424726 | 0.293637802 | 0.250194766 | 0.388614 | 0.172027 | 0.053053 | 0.002981555 | -0.000699325 | -0.000873306 |
| F | 0 | -0.000158378 | -0.01268 | -8.46079 | 0.483508 | -0.35031 | -0.109317908 | -0.066668645 | -0.29828 | -0.04562 | -0.00937 | -0.000371053 | 4.14965E-05 | 6.16414E-05 |
| G | 0 | 1.16222E-05 | 0.002579 | 3.408385 | -0.2537 | 0.160891 | 0 | 0 | 0.064085 | 0.004761 | 0.000655 | 1.97211E-05 | -1.03487E-06 | -1.78918E-06 |
| H | 0 | 0 | 0 | 0 | 0 | 0 | 0 | 0 | 0 | 0 | 0 | 0 | 0 | 0 |

FIG. 9

OPTICAL IMAGING SYSTEM

CROSS-REFERENCE TO RELATED APPLICATIONS

This application is a continuation of U.S. patent application Ser. No. 15/586,351 filed on May 4, 2017, now U.S. Pat. No. 10,247,916 issued on Apr. 2, 2019, which claims the benefit under 35 USC 119(a) of Korean Patent Application No. 10-2016-0179151 filed on Dec. 26, 2016, in the Korean Intellectual Property Office, the entire disclosures of which are incorporated herein by reference for all purposes.

BACKGROUND

1. Field

The following description relates to a telescopic optical imaging system including seven lenses.

2. Description of Related Art

In small cameras, the size of a pixel in an image sensor is reduced when the camera's resolution is improved. In detail, image sensors of cameras implementing a high resolution, of 12 megapixels or greater, may include pixels smaller than that of image sensors of cameras implementing a resolution of 8 megapixels. Because such pixels lead to a reduced amount of light incident on each pixel in the image sensors, the implementation of clear and bright images is difficult. Thus, optical imaging systems capable of improving the resolution and brightness of small cameras are being developed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having a positive refractive power, a second lens a refractive index of 1.65 or greater, a third lens having a positive refractive power and a refractive index of 1.65 or greater, a fourth lens having a positive refractive power, a fifth lens having a refractive index of 1.65 or greater, a sixth lens having a refractive index of 1.65 or greater, and a seventh lens having a positive refractive power. The first to seventh lenses are sequentially disposed from an object side to an imaging plane.

The first to seventh lenses of the optical imaging system may be formed using a plastic material. The first lens of the optical imaging system may have a convex object-side surface and a concave image-side surface along an optical axis. The second lens of the optical imaging system can have a convex object-side surface and a concave image-side surface along an optical axis. The third lens of the optical imaging system may have a convex object-side surface and a concave image-side surface along an optical axis.

The fourth lens of the optical imaging system can have opposing convex surfaces along an optical axis. The fifth lens of the optical imaging system may have a convex object-side surface and a concave image-side surface along an optical axis. The sixth lens of the optical imaging system can have a convex object-side surface and a concave image-side surface along an optical axis. The seventh lens of the optical imaging system may have a convex object-side surface and a concave image-side surface along an optical axis.

The optical imaging system may satisfy the expression V2+V3<V1, where V1 represents an Abbe number of the first lens, V2 represents an Abbe number of the second lens, and V3 represents an Abbe number of the third lens. The optical imaging system can satisfy the expression V5+V6<V4, where V4 represents an Abbe number of the fourth lens, V5 represents an Abbe number of the fifth lens, and V6 represents an Abbe number of the sixth lens. The optical imaging system may satisfy the expression CT2<0.2 mm, where CT2 represents a thickness of the second lens. The optical imaging system can have an F number that is less than or equal to 2.09.

In another general aspect, an optical imaging system includes a first lens having a positive refractive power, a second lens having a refractive index greater than or equal to 1.65, a third lens having a positive refractive power and a refractive index greater than or equal to 1.65, a fourth lens having a positive refractive power, a fifth lens having a refractive index greater than or equal to 1.65, a sixth lens having a refractive index greater than or equal to 1.65, and a seventh lens having a positive refractive power. The first to seventh lenses are sequentially disposed from an object side to an imaging plane.

The sixth lens of the optical imaging system may include an inflection point formed on one or both of an object-side surface or an image-side surface. The seventh lens of the optical imaging system can include an inflection point formed on one or both of an object-side surface or an image-side surface.

In another general aspect, an optical imaging system includes a first lens having a positive refractive power, a second lens having a negative refractive power, a third lens having a positive refractive power, a fourth lens having a positive refractive power, a fifth lens having a positive refractive power, a sixth lens having a negative refractive power, and a seventh lens having a positive refractive power. The first to seventh lenses are sequentially disposed from an object side to an imaging plane. The second lens, the third lens, the fifth lens, and the sixth lens each have a refractive index greater than or equal to 1.65. An F number of the optical imaging system is less than or equal to 2.09.

The first lens, the second lens, the fourth lens, and the seventh lens of the optical imaging system may each include a convex object-side surface along an optical axis. The optical imaging system can satisfy the expression 1.0<TTL/f, where TTL represents a distance from an object-side surface of the first lens to an imaging plane and f represents a focal length of the optical imaging system.

Other features and aspects will be apparent from the following detailed description, the drawings, and the claims.

BRIEF DESCRIPTION OF THE DRAWINGS

FIG. 3 is a table listing aspherical characteristics of the optical imaging system illustrated in FIG. 1.

FIG. 6 is a table listing aspherical characteristics of the optical imaging system illustrated in FIG. 4.

FIG. 9 is a table listing aspherical characteristics of the optical imaging system illustrated in FIG. 7.

Figure 1:
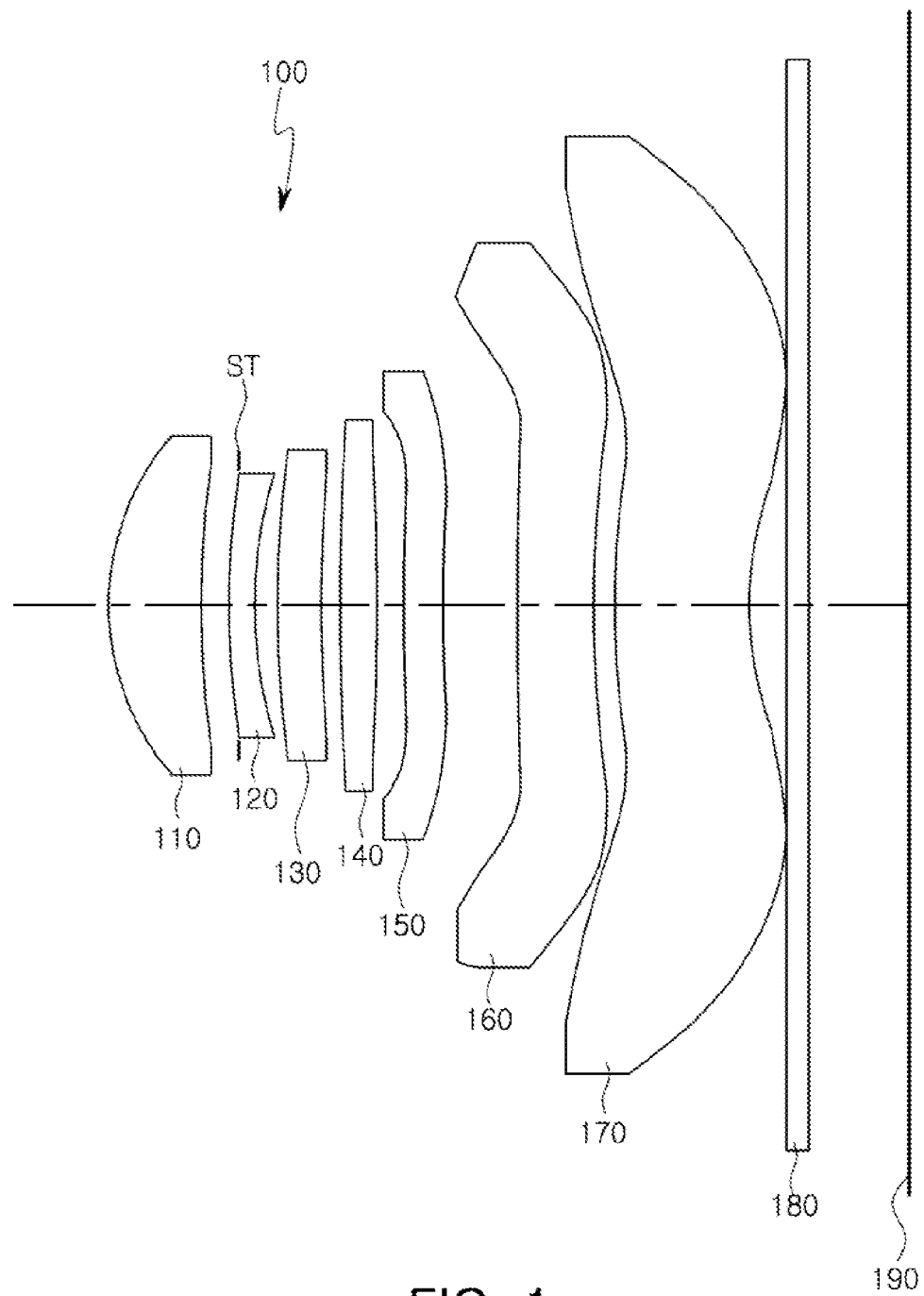
FIG. 1 is a diagram of an optical imaging system according to a first example.

Throughout the drawings and the detailed description, the same reference numerals refer to the same elements, where applicable. The drawings may not be to scale, and the relative size, proportions, and depiction of elements in the drawings may be exaggerated for clarity, illustration, or convenience.

DETAILED DESCRIPTION

Hereinafter, examples will be described with reference to the attached drawings. Examples provide a high-resolution, bright optical imaging system capable of being mounted in a small terminal. The disclosure may, however, be exemplified in many different forms and should not be construed as being limited to the specific embodiments set forth herein. Rather, these embodiments are provided so that this disclosure will be thorough and complete, and will fully convey the scope of the disclosure after an understanding of the application.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no elements or layers intervening therebetween. As used herein, the term "and/or" includes any and all combinations of one or more of the associated listed items.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the present specification, a first lens refers to a lens closest to an object or a subject of which an image is captured. A seventh lens refers to a lens closest to an imaging plane or an image sensor. In the present specification, an entirety of a radius of curvature, a thickness, a distance from an object-side surface of a first lens to an imaging plane (TTL), a half diagonal length of the imaging plane (IMG HT), and a focal length of a lens is indicated in millimeters (mm). A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical system, and a focal length of each lens are indicated in millimeters (mm). Likewise, thicknesses of lenses, gaps between the lenses, OALs, TLs, SLs are distances measured based on an optical axis of the lenses.

In a description of a form of a lens, a surface of a lens being convex means that an optical axis portion of a corresponding surface is convex, while a surface of a lens being concave means that an optical axis portion of a corresponding surface is concave. Therefore, in a configuration in which a surface of a lens is described as being convex, an edge portion of the lens may be concave. In a manner the same as the case described above, even in a configuration in which a surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

In accordance with illustrative examples, the embodiments described of the optical system include seven lenses with a refractive power. However, the number of lenses in the optical system may vary in some embodiments, for example, between two to seven lenses, while achieving one or more results and benefits described below. Also, although each lens is described with a particular refractive power, a different refractive power for at least one of the lenses may be used to achieve the intended result.

An optical imaging system includes seven lenses. For example, the optical imaging system may include the first lens, a second lens, a third lens, a fourth lens, a fifth lens, a sixth lens, and the seventh lens, sequentially disposed from an object side to an imaging plane.

The first lens has a refractive power. For example, the first lens has a positive refractive power. The first lens has a convex surface. In an embodiment, the first lens has a convex object-side surface.

The first lens has an aspherical surface. For example, both surfaces of the first lens are aspherical. The first lens may be formed using a material having a relatively high degree of light transmittance and excellent workability. In an example, the first lens is formed using a plastic material. The first lens has a relatively low refractive index. In an embodiment, a refractive index of the first lens is less than 1.6.

The second lens has a refractive power. For example, the second lens has a negative refractive power. The second lens has a convex surface. In an embodiment, the second lens has a convex object-side surface.

The second lens has an aspherical surface. For example, the second lens has an aspherical object-side surface. The second lens may be formed using a material having a relatively high degree of light transmittance and excellent workability. As an example, the second lens may be formed using a plastic material. The second lens has a refractive index higher than that of the first lens. In an embodiment, the refractive index of the second lens is greater than or equal to 1.6.

The third lens has a refractive power. For example, the third lens has a positive refractive power.

The third lens has an aspherical surface. In an embodiment, the third lens has an aspherical image-side surface. The third lens may be formed using a material having a relatively high degree of light transmittance and excellent workability. In an example, the third lens is formed using a plastic material. The third lens may have a refractive index substantially similar to that of the second lens. In an embodiment, the refractive index of the third lens is greater than or equal to 1.6.

The fourth lens has a refractive power. For example, the fourth lens has a positive refractive power. The fourth lens has a convex surface. In an embodiment, the fourth lens has a convex object-side surface.

The fourth lens has an aspherical surface. For example, both surfaces of the fourth lens are aspherical. The fourth lens may be formed using a material having a relatively high degree of light transmittance and excellent workability. In an example, the fourth lens is formed using a plastic material. The fourth lens has a refractive index substantially the same as that of the first lens. In an embodiment, the refractive index of the fourth lens is less than 1.6.

The fifth lens has a refractive power. For example, the fifth lens has a positive refractive power.

The fifth lens has an aspherical surface. In an embodiment, both surfaces of the fifth lens are aspherical. The fifth lens may be formed using a material having a relatively high degree of light transmittance and excellent workability. In an example, the fifth lens is formed using a plastic material. The fifth lens may have a refractive index substantially the same as that of the third lens. For example, the refractive index of the fifth lens is greater than or equal to 1.6.

The sixth lens has a refractive power. For example, the sixth lens has a negative refractive power. The sixth lens may have an inflection point. In an embodiment, the sixth lens includes one or more inflection points formed on opposing surfaces.

The sixth lens has an aspherical surface. For example, both surfaces of the sixth lens are aspherical. The sixth lens may be formed using a material having a relatively high degree of light transmittance and excellent workability. In an example, the sixth lens is formed using a plastic material. The sixth lens may have a refractive index substantially similar to that of the fifth lens. In an embodiment, the refractive index of the sixth lens is greater than or equal to 1.6.

The seventh lens has a refractive power. For example, the seventh lens has a positive refractive power. The seventh lens may have a convex surface. In an embodiment, the seventh lens may have a convex object-side surface. The seventh lens may have an inflection point. For example, the seventh lens includes one or more inflection points formed on opposing surfaces.

The seventh lens has an aspherical surface. For example, both surfaces of the seventh lens are aspherical. The seventh lens may be formed using a material having a relatively high degree of light transmittance and excellent workability. As an example, the seventh lens is formed using a plastic material. The seventh lens may have a refractive index less than that of the sixth lens. In an embodiment, the refractive index of the seventh lens is less than 1.6.

Aspherical surfaces of the first to seventh lenses may be expressed using Formula 1.

$$Z = \frac{cr^2}{1 + \sqrt{1-(1+k)c^2r^2}} + Ar^4 + Br^6 + Cr^8 + Dr^{10} + Er^{12} + Fr^{14} + Gr^{16} + Hr^{18} + Jr^{20} \qquad \text{[Formula 1]}$$

In Formula 1, c represents an inverse of a radius of curvature of a lens, k represents a conic constant, r represents a distance from a certain point on an aspherical surface of the lens to an optical axis, A to J represent aspherical constants, and Z (or SAG) represents a distance between the certain point on the aspherical surface of the lens at the distance r and a tangential plane meeting the apex of the aspherical surface of the lens.

The optical imaging system further includes a filter, an image sensor, and a stop. The filter is interposed between the seventh lens and the image sensor. The filter may block light having a portion of wavelengths of visible light, in order to generate a clear image. For example, the filter blocks light of an infrared wavelength.

The image sensor forms an imaging plane. As an example, a surface of the image sensor forms the imaging plane. The stop is disposed to adjust an amount of light incident on a lens. In an embodiment, the stop is interposed between the first lens and the second lens.

The optical imaging system satisfies the following Conditional Equations:

| | |
|---|---|
| $F \text{ No.} \leq 2.09$ | [Conditional Equation 1] |
| $V2+V3<V1$ | [Conditional Equation 2] |
| $V5+V6<V4$ | [Conditional Equation 3] |
| $CT2<0.2 \text{ mm}$ | [Conditional Equation 4] |
| $1.0<TTL/f$ | [Conditional Equation 5] |

In the Conditional Equations, f represents an overall focal length of the optical imaging system, V1 represents an Abbe number of the first lens, V2 represents an Abbe number of the second lens, V3 represents an Abbe number of the third lens, V4 represents an Abbe number of the fourth lens, V5 represents an Abbe number of the fifth lens, V6 represents an Abbe number of the sixth lens, TTL represents a distance from an object-side surface of the first lens to an imaging plane, and CT2 represents a thickness of the second lens.

Conditional Equations 2 to 4 are provided as parametric relationships for the miniaturization of the optical imaging system. For example, the optical imaging system satisfying one or more Conditional Equations among Conditional Equations 2 to 4 reduces an overall imaging distance (that is, TTL).

Subsequently, an optical imaging system according to various examples will be described. First of all, the optical imaging system according to a first example will be described with reference to FIG. 1. An optical imaging system 100 includes a first lens 110, a second lens 120, a third lens 130, a fourth lens 140, a fifth lens 150, a sixth lens 160, and a seventh lens 170.

The first lens 110 has a positive refractive power, a convex object-side surface, and a concave image-side surface. The second lens 120 has a negative refractive power, a convex object-side surface, and a concave image-side surface. The third lens 130 has a positive refractive power, a convex object-side surface, and a concave image-side surface. The fourth lens 140 has a positive refractive power and opposing convex surfaces. The fifth lens 150 has a positive refractive power, a convex object-side surface, and a concave image-side surface. The sixth lens 160 has a negative refractive power, a convex object-side surface, and a concave image-side surface. In addition, sixth lens 160 includes inflection points formed on opposing surfaces. The seventh lens 170 has a positive refractive power, a convex object-side surface, and a concave image-side surface. In addition, seventh lens 170 includes inflection points formed on opposing surfaces.

Optical imaging system 100 further includes a filter 180, an image sensor 190, and a stop ST. Filter 180 is interposed between seventh lens 170 and image sensor 190, while stop ST is interposed between first lens 110 and second lens 120.

Optical imaging system 100 includes a plurality of lenses having relatively high refractive indices. For example, second lens 120, third lens 130, fifth lens 150, and sixth lens 160 have refractive indices greater than or equal to 1.6. In an embodiment, the refractive indices of second lens 120, third lens 130, fifth lens 150, and sixth lens 160 are greater than 1.65 and less than 2.0.

Optical imaging system 100 is configured to implement a bright optical imaging system. In detail, an F number of optical imaging system 100 is 2.09. Optical imaging system 100 has a relatively wide angle of view. For example, an overall angle of view of the optical imaging system 100 is 83.3.

Optical imaging system 100 satisfies each of Conditional Equations 2 to 5, described above. As examples, in optical imaging system 100, the sum (V2+V3=40.7) of an Abbe number of second lens 120 (V2=20.35) and an Abbe number of third lens 130 (V3=20.35) is less than an Abbe number of first lens 110 (V1=56.11). The sum (V5+V6=40.7) of an Abbe number of the fifth lens 150 (V5=20.35) and an Abbe number of the sixth lens 160 (V6=20.35) is less than an Abbe number (V4=56.11) of the fourth lens 140. In addition, a thickness of the second lens 120 is 0.13 mm, while an imaging distance to focal length ratio (TTL/f) is 1.20.

Figure 2:
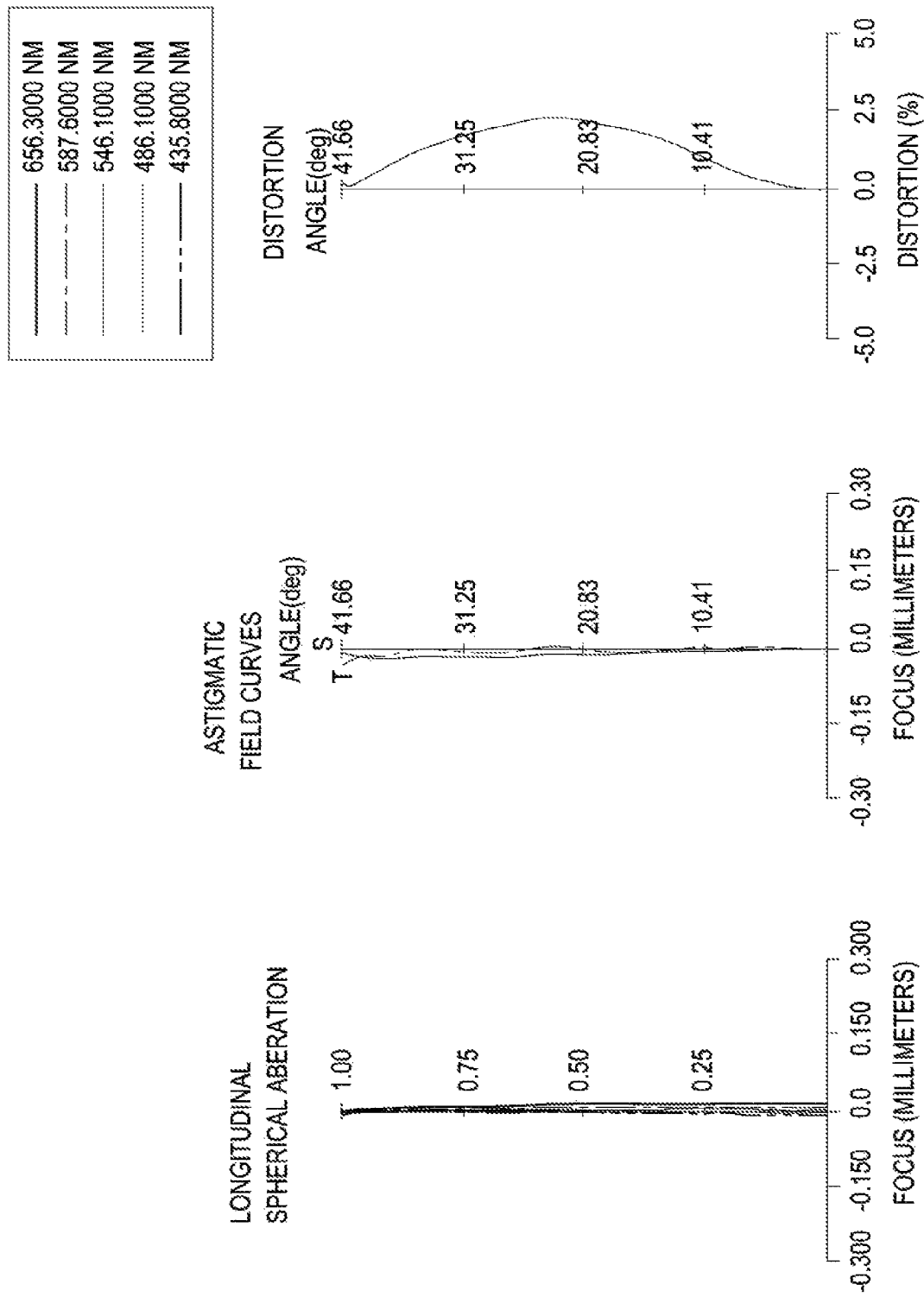
FIG. 2 is a set of graphs illustrating aberration curves of the optical imaging system illustrated in FIG. 1.

An optical imaging system having the configuration described above has aberration characteristics as illustrated by the graphs in FIG. 2. FIG. 3 lists aspherical characteristics of the optical imaging system according to the example. Table 1 lists lens characteristics of the optical imaging system according to the example.

TABLE 1

First Example
F No. = 2.090
f = 3.4900
TTL = 4.200

| Surface No. | | Radius of Curvature | Thickness/ Distance | index | Abbe Number | Focal length |
|---|---|---|---|---|---|---|
| S1 | First lens | 1.3902 | 0.4852 | 1.547 | 56.113 | 3.203 |
| S2 | | 5.9254 | 0.1433 | | | |
| | Stop | infinity | 0 | | | |
| S3 | Second lens | 4.5499 | 0.1300 | 1.668 | 20.353 | -6.733 |

TABLE 1-continued

First Example
F No. = 2.090
f = 3.4900
TTL = 4.200

| Surface No. | | Radius of Curvature | Thickness/ Distance | index | Abbe Number | Focal length |
|---|---|---|---|---|---|---|
| S4 | | 2.2360 | 0.1251 | | | |
| S5 | Third lens | 4.2504 | 0.2259 | 1.668 | 20.353 | 41.230 |
| S6 | | 4.9191 | 0.1000 | | | |
| S7 | Fourth lens | 13.0519 | 0.2000 | 1.547 | 56.113 | 16.898 |
| S8 | | -31.4071 | 0.1680 | | | |
| S9 | Fifth lens | 10.936 | 0.2050 | 1.668 | 20.353 | 87.414 |
| S10 | | 13.3547 | 0.3604 | | | |
| S11 | Sixth lens | 13.1415 | 0.4077 | 1.668 | 20.353 | -13.203 |
| S12 | | 5.2120 | 0.1000 | | | |
| S13 | Seventh lens | 1.5777 | 0.7175 | 1.537 | 55.656 | 127.157 |
| S14 | | 1.3586 | 0.1819 | | | |
| S15 | Filter | Infinity | 0.1100 | 1.518 | 64.197 | |
| S16 | | Infinity | 0.5424 | | | |
| S17 | imaging plane | Infinity | -0.0024 | | | |

Figure 4:
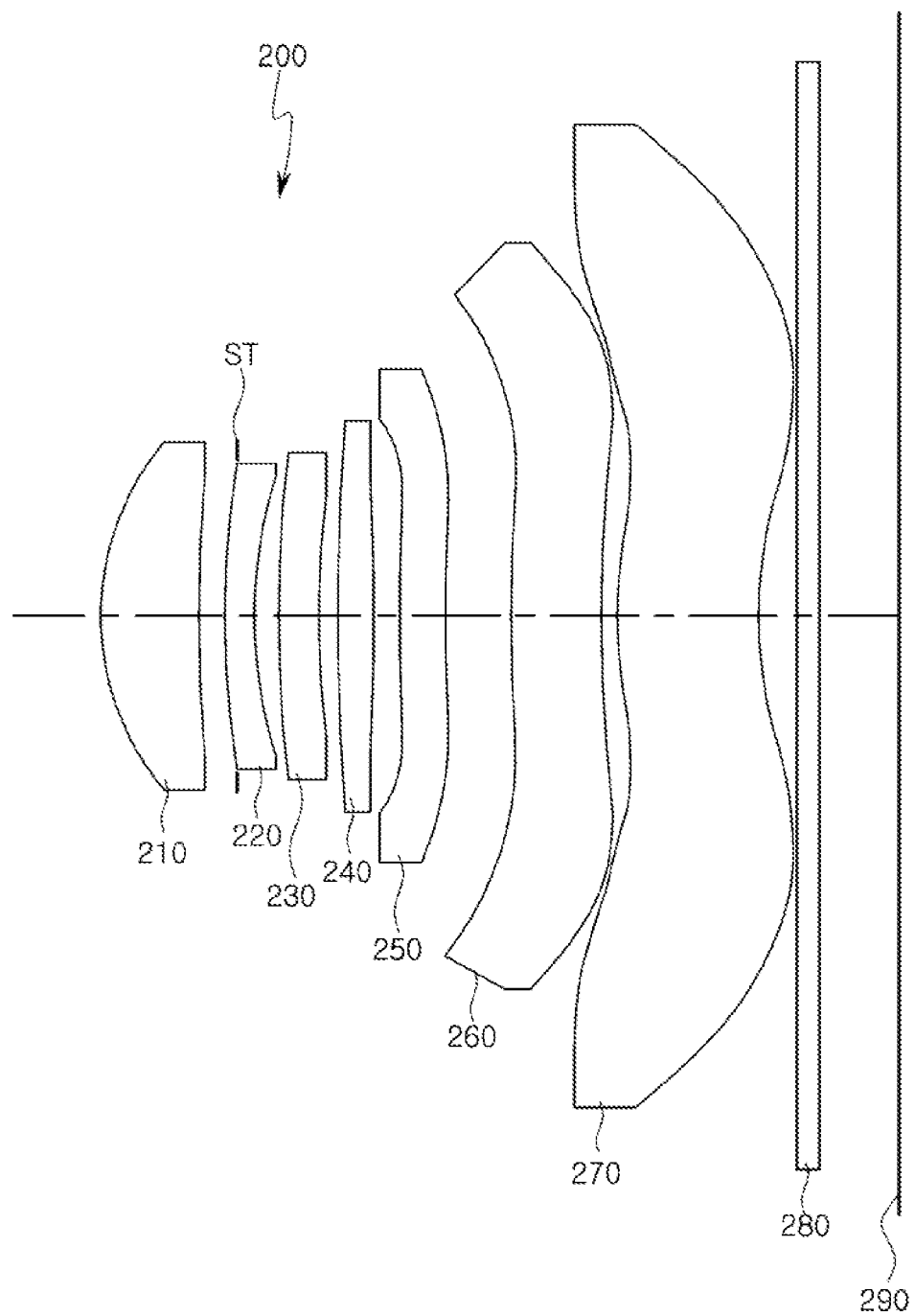
FIG. 4 is a diagram of an optical imaging system according to a second example.

An optical imaging system according to a second example will be described with reference to FIG. 4. An optical imaging system 200 includes a first lens 210, a second lens 220, a third lens 230, a fourth lens 240, a fifth lens 250, a sixth lens 260, and a seventh lens 270.

The first lens 210 has a positive refractive power, a convex object-side surface, and a concave image-side surface. The second lens 220 has a negative refractive power, a convex object-side surface, and a concave image-side surface. The third lens 230 has a positive refractive power, a convex object-side surface, and a concave image-side surface. The fourth lens 240 has a positive refractive power and opposing convex surfaces. The fifth lens 250 has a positive refractive power, a convex object-side surface, and a concave image-side surface. The sixth lens 260 has a negative refractive power, a convex object-side surface, and a concave image-side surface. In addition, sixth lens 260 includes inflection points formed on opposing surfaces. The seventh lens 270 has a positive refractive power, a convex object-side surface, and a concave image-side surface. In addition, seventh lens 270 includes inflection points formed on opposing surfaces.

Optical imaging system 200 further includes a filter 280, an image sensor 290, and a stop ST. Filter 280 is interposed between seventh lens 270 and image sensor 290, while stop ST is interposed between first lens 210 and second lens 220.

Optical imaging system 200 includes a plurality of lenses having relatively high refractive indices. For example, second lens 220, third lens 230, fifth lens 250, and sixth lens 260 have refractive indices greater than or equal to 1.6. In an embodiment, the refractive indices of second lens 220, third lens 230, fifth lens 250, and sixth lens 260 are greater than 1.65 and less than 2.0.

Optical imaging system 200 is configured to implement a bright optical imaging system. In detail, an F number of optical imaging system 200 is 1.89. Optical imaging system 200 has a relatively wide angle of view. For example, an overall angle of view of the optical imaging system 200 is 83.3.

Optical imaging system 200 satisfies each of Conditional Equations 2 to 5, described above. For example, in optical imaging system 200, the sum (V2+V3=40.7) of an Abbe number of second lens 220 (V2=20.35) and an Abbe number of third lens 230 (V3=20.35) is less than an Abbe number (V1=56.11) of first lens 210. The sum (V5+V6=40.7) of an Abbe number of fifth lens 250 (V5=20.35) and an Abbe number of sixth lens 260 (V6=20.35) is less than an Abbe number of fourth lens 240 (V4=56.11). In addition, a thickness of second lens 220 is 0.144 mm, while an imaging distance to focal length ratio (TTL/f) is 1.225.

Figure 5:
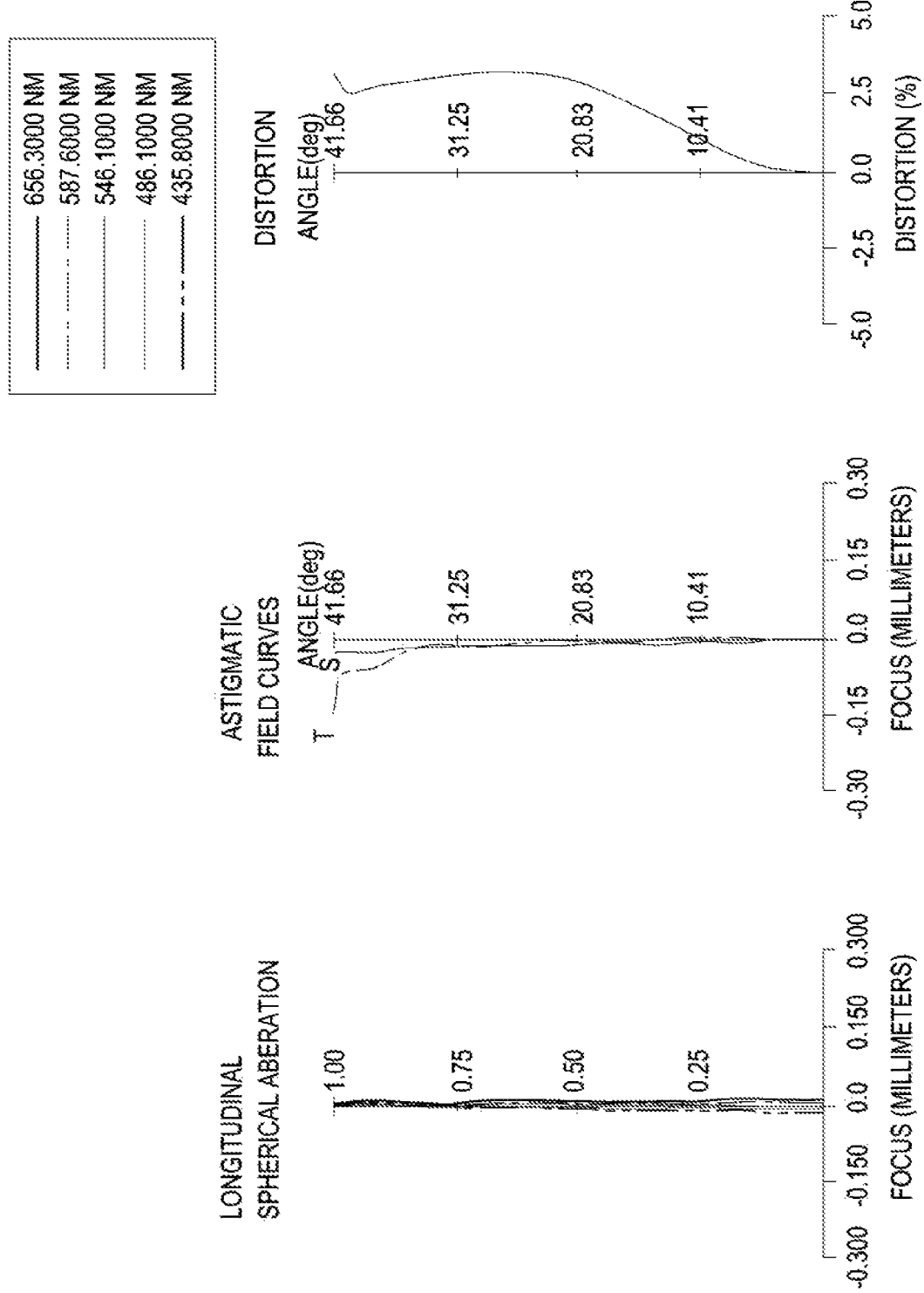
FIG. 5 is a set of graphs illustrating aberration curves of the optical imaging system illustrated in FIG. 4.

An optical imaging system having the configuration described above has aberration characteristics as illustrated by the graphs in FIG. 5. FIG. 6 lists aspherical characteristics of the optical imaging system according to the example. Table 2 lists lens characteristics of the optical imaging system according to the example.

TABLE 2

Second Example
F No. = 1.890
f = 3.3800
TTL = 4.141

| Surface No. | | Radius of Curvature | Thickness/ Distance | index | Abbe Number | Focal length |
|---|---|---|---|---|---|---|
| S1 | First lens | 1.3852 | 0.4985 | 1.547 | 56.113 | 3.165 |
| S2 | | 6.0739 | 0.1481 | | | |
| | Stop | infinity | 0 | | | |
| S3 | Second lens | 4.7250 | 0.1436 | 1.668 | 20.353 | −6.656 |
| S4 | | 2.2628 | 0.1242 | | | |
| S5 | Third lens | 3.7948 | 0.2133 | 1.668 | 20.353 | 38.588 |
| S6 | | 4.3497 | 0.0918 | | | |
| S7 | Fourth lens | 10.9431 | 0.1985 | 1.547 | 56.113 | 17.363 |
| S8 | | −70.9467 | 0.1687 | | | |
| S9 | Fifth lens | 9.241 | 0.2218 | 1.668 | 20.353 | 68.063 |
| S10 | | 11.4872 | 0.3649 | | | |
| S11 | Sixth lens | 12.8242 | 0.4171 | 1.668 | 20.353 | −12.887 |
| S12 | | 5.0838 | 0.0868 | | | |
| S13 | Seventh lens | 1.5712 | 0.7230 | 1.537 | 55.656 | 125.277 |
| S14 | | 1.3503 | 0.2087 | | | |
| S15 | Filter | Infinity | 0.1100 | 1.518 | 64.197 | |
| S16 | | Infinity | 0.4205 | | | |
| S17 | imaging plane | Infinity | 0.0014 | | | |

Figure 7:
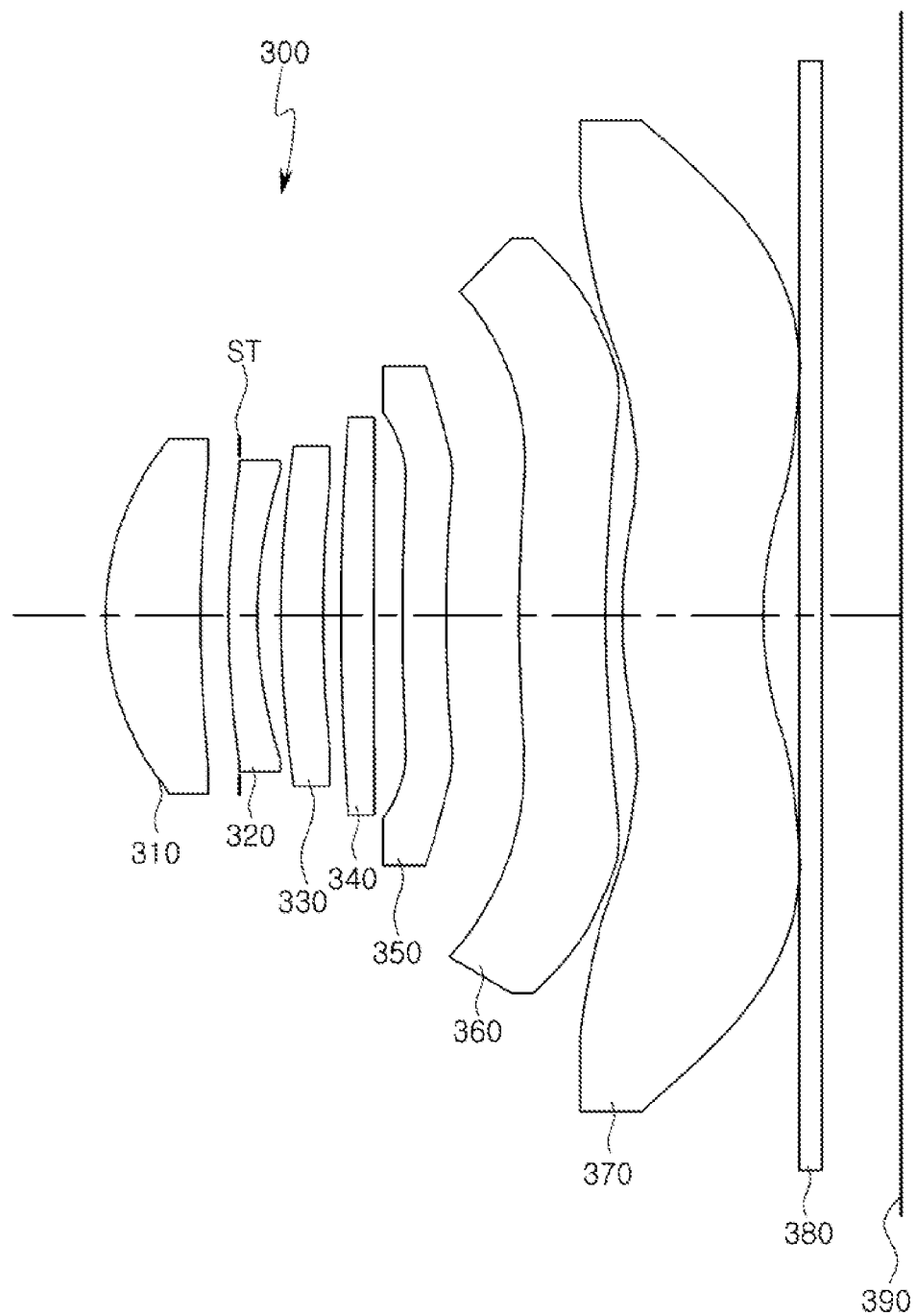
FIG. 7 is a diagram of an optical imaging system according to a third example.

An optical imaging system according to a third example will be described with reference to FIG. 7. An optical imaging system 300 includes a first lens 310, a second lens 320, a third lens 330, a fourth lens 340, a fifth lens 350, a sixth lens 360, and a seventh lens 370.

The first lens 310 has a positive refractive power, a convex object-side surface, and a concave image-side surface. The second lens 320 has a negative refractive power, a convex object-side surface, and a concave image-side surface. The third lens 330 has a positive refractive power, a convex object-side surface, and a concave image-side surface. The fourth lens 340 has a positive refractive power and opposing convex surfaces. The fifth lens 350 has a positive refractive power, a convex object-side surface, and a concave image-side surface. The sixth lens 360 has a negative refractive power, a convex object-side surface, and a concave image-side surface. In addition, sixth lens 360 includes inflection points formed on opposing surfaces. The seventh lens 370 has a positive refractive power, a convex object-side surface, and a concave image-side surface. In addition, seventh lens 370 includes inflection points formed on opposing surfaces.

Optical imaging system 300 further includes a filter 380, an image sensor 390, and a stop ST. Filter 380 is interposed between seventh lens 370 and image sensor 390, while stop ST is interposed between first lens 310 and second lens 320.

Optical imaging system 300 includes a plurality of lenses having relatively high refractive indices. For example, second lens 320, third lens 330, fifth lens 350, and sixth lens 360 have refractive indices greater than or equal to 1.6. In detail, the refractive indices of second lens 320, third lens 330, fifth lens 350, and sixth lens 360 are greater than 1.65 and less than 2.0.

Optical imaging system 300 is configured to implement a bright optical imaging system. In detail, an F number of optical imaging system 300 is 1.89. Optical imaging system 300 has a relatively wide angle of view. For example, an overall angle of view of the optical imaging system 300 is 85.2.

Optical imaging system 300 satisfies each of Conditional Equations 2 to 5, described above. For example, in optical imaging system 300, the sum (V2+V3=40.7) of an Abbe number of second lens 320 (V2=20.35) and an Abbe number of third lens 330 (V3=20.35) is less than an Abbe number of first lens 310 (V1=56.11). The sum (V5+V6=40.7) of an Abbe number of fifth lens 350 (V5=20.35) and an Abbe number of sixth lens 360 (V6=20.35) is less than an Abbe number of fourth lens 340 (V4=56.11). In addition, a thickness of second lens 320 is 0.158 mm, while an imaging distance to focal length ratio (TTL/f) is 1.223.

Figure 8:
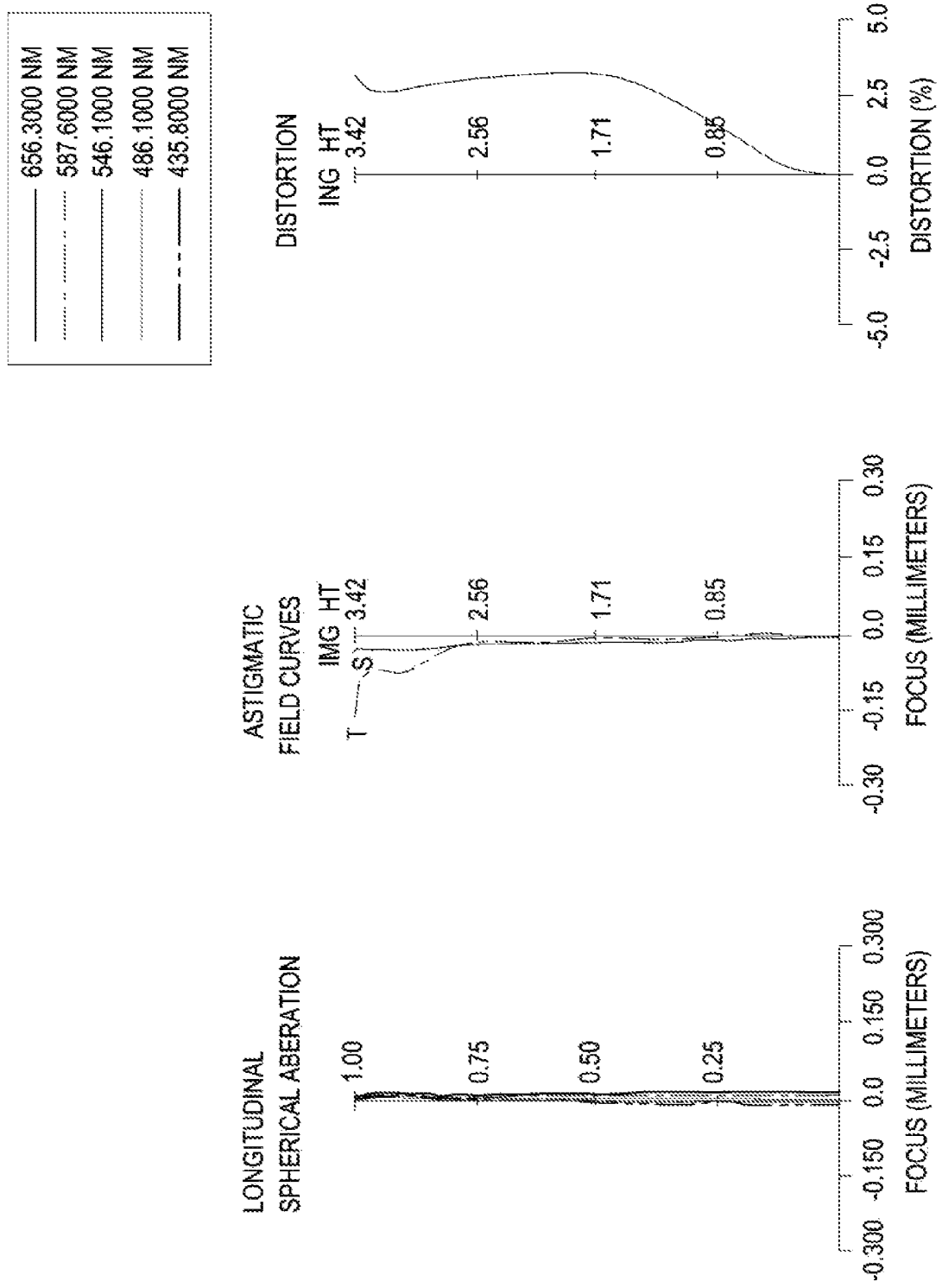
FIG. 8 is a set of graphs illustrating aberration curves of the optical imaging system illustrated in FIG. 7.

An optical imaging system having the configuration described above has aberration characteristics, as illustrated by the graphs in FIG. 8. FIG. 9 lists aspherical characteristics of the optical imaging system according to the example. Table 3 lists lens characteristics of the optical imaging system according to the example.

TABLE 3

Third Example
F No. = 1.890
f = 3.7200
TTL = 4.551

| Surface No. | | Radius of Curvature | Thickness/ Distance | index | Abbe Number | Focal length |
|---|---|---|---|---|---|---|
| S1 | First lens | 1.5238 | 0.5483 | 1.547 | 56.113 | 3.481 |
| S2 | | 6.6813 | 0.1629 | | | |
| | Stop | infinity | 0 | | | |
| S3 | Second lens | 5.1975 | 0.1579 | 1.668 | 20.353 | −7.322 |
| S4 | | 2.4891 | 0.1366 | | | |
| S5 | Third lens | 4.1742 | 0.2347 | 1.668 | 20.353 | 42.448 |
| S6 | | 4.7846 | 0.1010 | | | |
| S7 | Fourth lens | 12.0374 | 0.2184 | 1.547 | 56.113 | 19.099 |
| S8 | | −78.0414 | 0.1856 | | | |
| S9 | Fifth lens | 10.165 | 0.2440 | 1.668 | 20.353 | 74.869 |
| S10 | | 12.6359 | 0.4014 | | | |
| S11 | Sixth lens | 14.1066 | 0.4588 | 1.668 | 20.353 | −14.176 |
| S12 | | 5.5922 | 0.0955 | | | |
| S13 | Seventh lens | 1.7283 | 0.7953 | 1.537 | 55.656 | 137.796 |
| S14 | | 1.4853 | 0.2087 | | | |
| S15 | Filter | Infinity | 0.1100 | 1.518 | 64.197 | |
| S16 | | Infinity | 0.4907 | | | |
| S17 | imaging plane | Infinity | 0.0014 | | | |

As set forth above, according to examples, an optical imaging system capable of capturing a distant image and being mounted in a small terminal may be provided. While this disclosure includes specific examples, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples.

Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens, a fourth lens, a fifth lens, a sixth lens, and a seventh lens, wherein the first to seventh lenses are sequentially disposed along an optical axis from an object side of the optical imaging system toward an imaging plane of the optical imaging system,
wherein the first lens has a concave image-side surface,
the second lens has a negative refractive power,
the fourth lens has a convex object-side surface;
the fifth lens has a concave image-side surface,
four or more lenses among the first to seventh lenses have a refractive index greater than 1.6, and
the first to seventh lenses are the only lenses disposed between the object side of the optical imaging system and the imaging plane of the optical imaging system.

2. The optical imaging system of claim 1, wherein the first to seventh lenses are made of a plastic material.

3. The optical imaging system of claim 1, wherein the concave image-side surface of the first lens is concave along the optical axis, and
the first lens further has a convex object-side surface along the optical axis.

4. The optical imaging system of claim 1, wherein the second lens has a convex object-side surface along the optical axis and a concave image-side surface along the optical axis.

5. The optical imaging system of claim 1, wherein the third lens has a convex object-side surface along the optical axis and a concave image-side surface along the optical axis.

6. The optical imaging system of claim 1, wherein the convex object-side surface of the fourth lens is convex along an optical axis, and
the fourth lens further has a convex image-side surface along the optical axis.

7. The optical imaging system of claim 1, wherein the concave image-side surface of the fifth lens is concave along the optical axis, and
the fifth lens further has a convex object-side surface along the optical axis.

8. The optical imaging system of claim 1, wherein the sixth lens has a convex object-side surface along the optical axis and a concave image-side surface along the optical axis.

9. The optical imaging system of claim 1, wherein the seventh lens has a convex object-side surface along the optical axis and a concave image-side surface along the optical axis.

10. The optical imaging system of claim 1, wherein the optical imaging system satisfies the following expression:

$$V2+V3<V1$$

where V1 represents an Abbe number of the first lens, V2 represents an Abbe number of the second lens, and V3 represents an Abbe number of the third lens.

11. The optical imaging system of claim 1, wherein the optical imaging system satisfies the following expression:

$$V5+V6<V4$$

where V4 represents an Abbe number of the fourth lens, V5 represents an Abbe number of the fifth lens, and V6 represents an Abbe number of the sixth lens.

12. The optical imaging system of claim 1, wherein the optical imaging system satisfies the following expression:

$$CT2<0.2 \text{ mm}$$

where CT2 represents a thickness of the second lens.

13. The optical imaging system of claim 1, wherein an f-number of the optical imaging system is less than or equal to 2.09.

14. The optical imaging system of claim 1, wherein the third lens has a positive refractive power.

15. The optical imaging system of claim 1, wherein the seventh lens has a positive refractive power.

16. An optical imaging system comprising:
a first lens having a positive refractive power and a concave image-side surface;
a second lens having a refractive index greater than or equal to 1.65;
a third lens having a positive refractive power and a refractive index greater than or equal to 1.65;
a fourth lens having a positive refractive power;
a fifth lens having a refractive index greater than or equal to 1.65;
a sixth lens having a refractive index greater than or equal to 1.65; and
a seventh lens having a positive refractive power,
wherein the first to seventh lenses are sequentially disposed from an object side toward an imaging plane.

17. The optical imaging system of claim 16, wherein the sixth lens has an inflection point on one or both of an object-side surface or an image-side surface.

18. The optical imaging system of claim 16, wherein the seventh lens has an inflection point on one or both of an object-side surface or an image-side surface.

19. An optical imaging system comprising:
a first lens having a positive refractive power and a concave image-side surface;
a second lens having a negative refractive power;
a third lens having a positive refractive power;
a fourth lens having a positive refractive power;
a fifth lens having a positive refractive power;
a sixth lens having a negative refractive power; and
a seventh lens having a positive refractive power,
wherein the first to seventh lenses are sequentially disposed from an object side toward an imaging plane,
the second lens, the third lens, the fifth lens, and the sixth lens each have a refractive index greater than or equal to 1.65, and
an f-number of the optical imaging system is less than or equal to 2.09.

20. The optical imaging system of claim 19, wherein the first lens, the second lens, the fourth lens, and the seventh lens each have a convex object-side surface along an optical axis.

21. The optical imaging system of claim 19, wherein the optical imaging system satisfies the following expression:

$$1.0<TTL/f$$

where TTL represents a distance from an object-side surface of the first lens to the imaging plane, and f represents a focal length of the optical imaging system.

* * * * *